March 9, 1954 P. C. MARCOU 2,671,850

RADIO RELAYING SYSTEM

Filed Feb. 4, 1952 4 Sheets-Sheet 1

Inventor
Pierre C. Marcou
By
Ibenderoth, Lind & Ponack
Attorneys

March 9, 1954 P. C. MARCOU 2,671,850

RADIO RELAYING SYSTEM

Filed Feb. 4, 1952 4 Sheets-Sheet 2

Inventor
Pierre C. Marcou
By
Thunderoth, Lind & Ponack
Attorneys.

RADIO RELAYING SYSTEM

Filed Feb. 4, 1952 4 Sheets-Sheet 3

Inventor
Pierre C. Marcou
By:
Strauch, Nolan & Diggins [signature]
Attorneys.

Inventor.
Pierre C. Marcou
By:
Ihenderoth, Lind & Ponack
Attorneys.

Patented Mar. 9, 1954 2,671,850

UNITED STATES PATENT OFFICE 2,671,850

RADIO RELAYING SYSTEM

Pierre C. Marcou, Paris, France

Application February 4, 1952, Serial No. 269,757

Claims priority, application France
February 7, 1951

3 Claims. (Cl. 250—15)

The present invention relates to a device for simultaneous reception and retransmission without reaction between the transmitter and the receiver which are placed near each other.

This invention relates generally to a radio relaying system and to devices of the so-called responder type which employ continuous modulated carrier waves to convey the signals. It is also applied to apparatus of the kind which have to retransmit a pulsatory wave with a delay which is less than the duration of the pulses which compose this pulsatory wave, in which case the received and retransmitted pulses have, in the time, a common portion.

The responder of the invention is not intended to form part of a chain of intermediate relaying stations placed at intervals between two terminal stations. It is intended to receive a wave transmitted by a given station and to return this wave, exactly on the same frequency, to this station in order to produce a signalling action thereat.

Responders have the known disadvantage of giving rise to singing of oscillations by reaction between the transmitter and the receiver.

In pulse modulated carrier wave systems, it is possible to use a single wave-length on the to and fro sides of the responder station. The transmitter of the responder station is driven by the received pulses and mutual interference is prevented by retransmitting the pulses after a suitable small delay, the receiver being blocked for the period of each retransmitted pulse.

In continuous modulated carrier wave systems, various expedients have been proposed for preventing singing. Among these expedients are change of carrier frequency in the responder station, employment of the so-called superregenerative circuit in which an amplifier having a feedback that would tend to permit or produce continuous oscillations is associated with a quench oscillator which periodically checks the re-amplifying process and a method which consists in demodulating the signals received, recording them on a recording medium and utilising them as modulation of a radio-frequency transmitter. The disadvantage of the first solution is that, the return wave having a frequency different from the incoming wave, it cannot be used when it is desired to produce a signalling action in a radioelectric station only in the case when the said station is receiving from a responder a wave which has exactly the same carrier frequency as the wave transmitted by this station. The disadvantage of the second solution is that it cannot operate on a wide frequency band and with a substantial retransmission power. Finally, the disadvantage of the third solution is that the retransmitted frequency is fixed and is not driven by the incoming wave frequency.

One of the objects of the present invention is to provide a retransmitting device without coupling between the transmission and the reception, which device operates in the case in which the received wave is a continuous wave and utilises for the retransmission the same carrier frequency as for the reception.

Another object of the invention is to provide a retransmitting device which operates on a single frequency without coupling between the transmission and the reception and renders possible a considerable difference of level between the received signal and the retransmitted signal.

Another object of the invention is to provide a retransmitting device which is insensitive to the reflections of the retransmitted energy on neighbouring obstacles.

According to the main feature of the invention, the radio-frequency reception and transmission amplifiers of the retransmitter are blocked and unblocked at the same cadence and in such a manner that the blocking times of one correspond substantially to the unblocking times of the other. The result of this is a high-frequency pulsatory signal at the outlet of the two amplifiers.

The signal which leaves the receiver has a spectrum of equidistant lines or components, the medial line of which is that of the frequency of the received carrier wave and the others of which are spaced from this medial line by multiples of the blocking and unblocking frequency. Each of these lines is accompanied by lateral lines which correspond to the frequency of modulation of the signal. The pulsated signal leaving the receiver is filtered so as to leave only the fundamental component (i. e. the component having the carrier frequency) which is then applied to the transmitter which it drives.

The signal which leaves the transmitter is radiated and constitutes the retransmitted signal. This retransmitted signal arrives at the receiver during the blocking times of the latter.

Summarising, the signal to be retransmitted arrives continuously at the receiver during the periods of blocking and together during the periods of unblocking of the latter, and this signal becomes a pulsatory signal. The filter extracts from it the fundamental component which is available without interruption at the outlet of the filter and serves for driving the transmitter.

It is to be noted that the circuits of the receiver which precede the circuit to which the blocking signal is applied should have a sufficient bandwidth so as not to deform the retransmitted pulsated signal. Without this condition, a spectral decomposition of the latter would take place and the fundamental component, possibly accompanied by some harmonics, would be present at the inlet of the blocking circuit during the unblocking time of the latter and would be retransmitted. There would therefore be in this case a singing action. If these precautions are taken, the following result is obtained: the fundamental component of the signal to be retransmitted, which has been made pulsatory by the blocking of the receiver, passes through the filter, whilst the fundamental component of the retransmitted signal, which is pulsatory by nature, does not pass through the filter.

Other objects and features of the invention will appear on reading the following detailed description and examining the accompanying drawings, in which.

Figure 1:
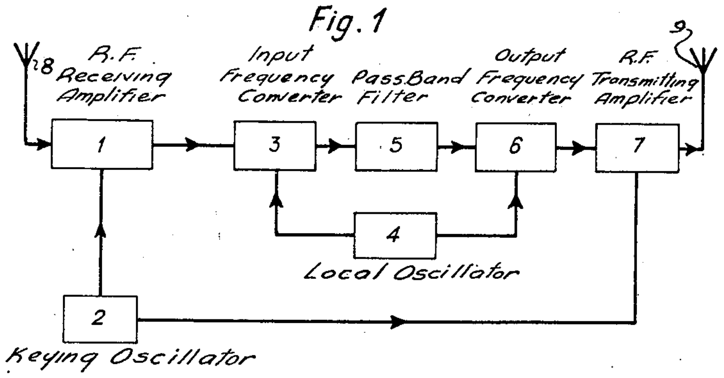
Fig. 1 represents the retransmitter of the invention in the form of a block diagram.
Figure 3:
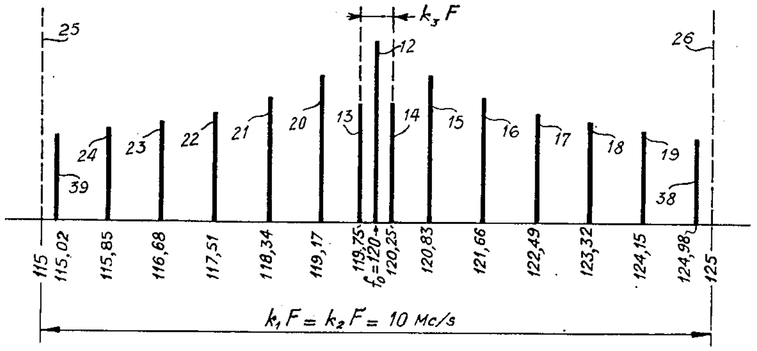
Figure 3A:
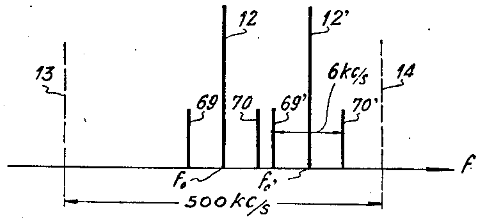
Figure 4:
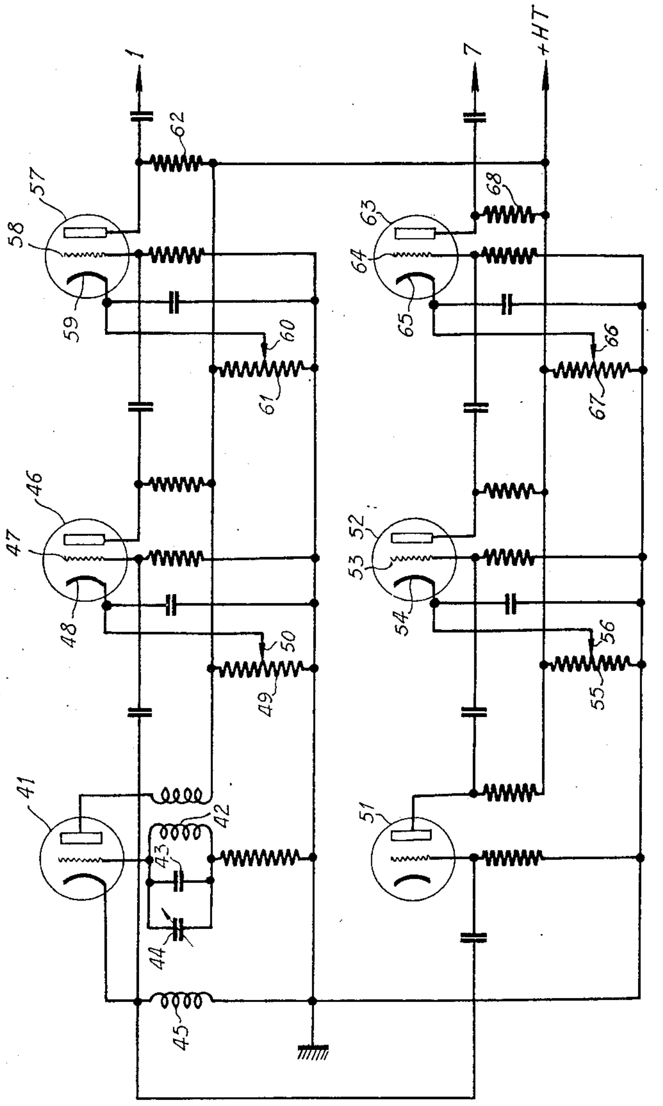
Figure 5:
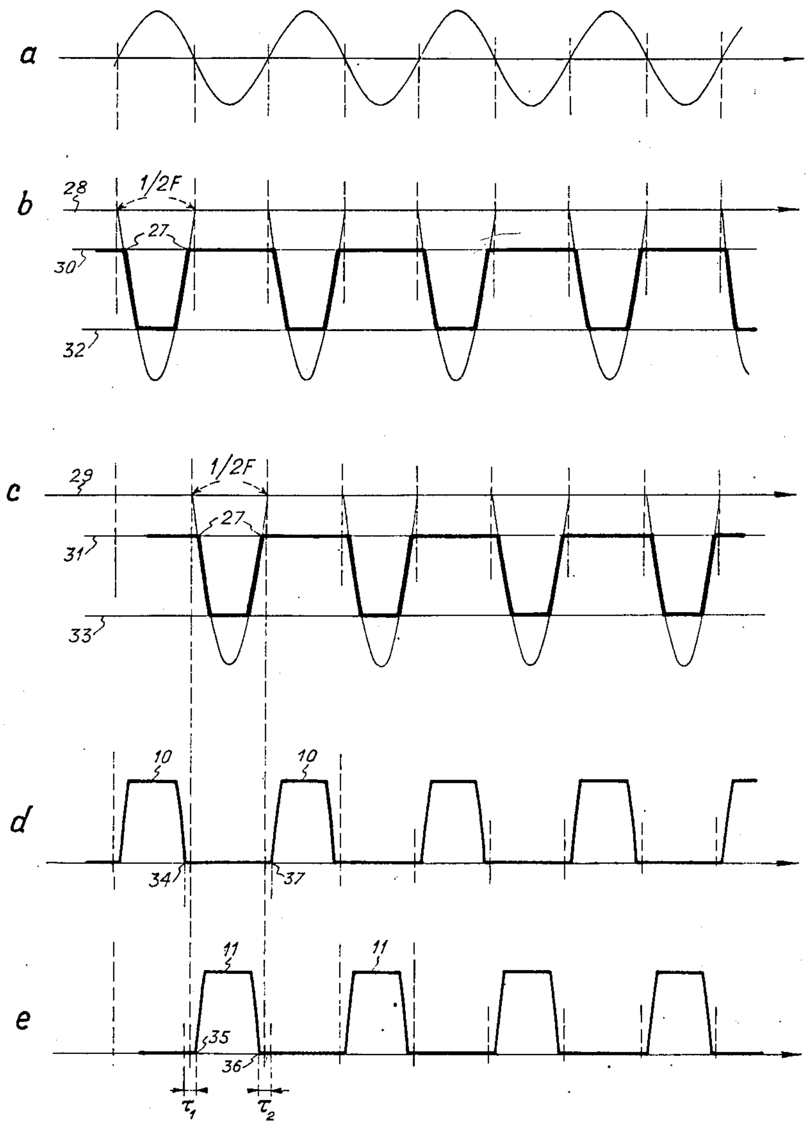

Figs. 3 and 3*a* represent the spectral composition of the signals at different points of the diagram shown in Fig. 1;

Fig. 4 is a detail representation of the quench oscillator of the retransmitter; and Fig. 5 represents the shape of the signals at different points of the oscillator shown in Fig. 4.

Figure 2:
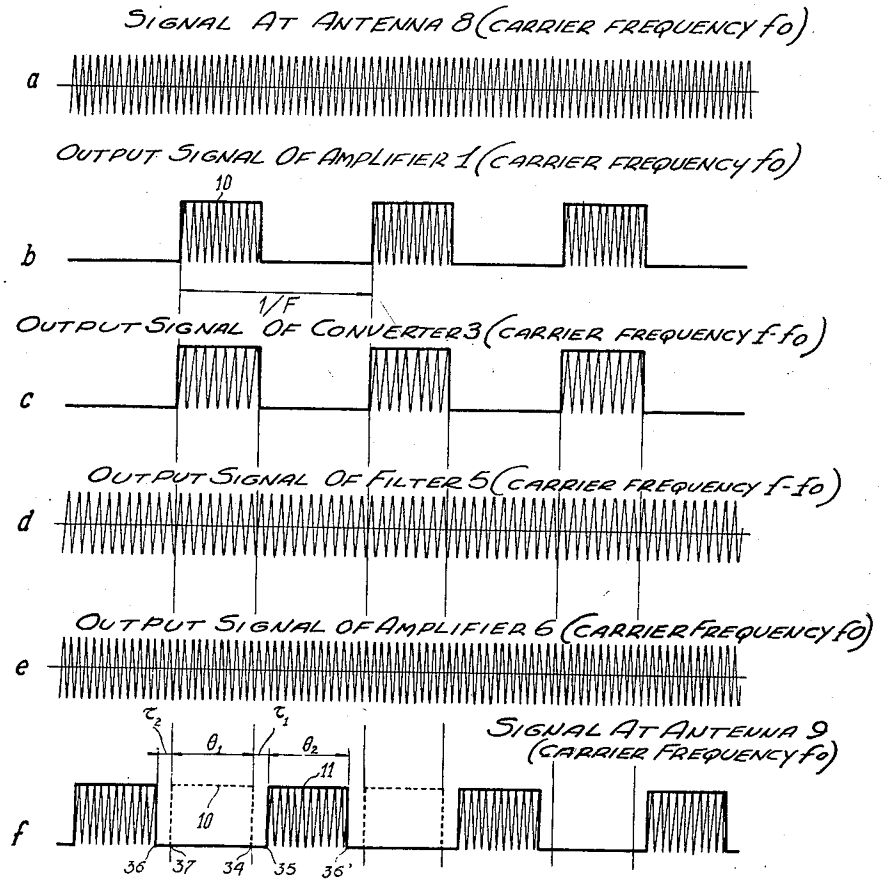
Fig. 2 represents the shape of the signals at different points in the diagram shown in Fig. 1.

Referring to Fig. 1, 8 is a reception aerial which receives a continuous radio communication of carrier frequency $f_o$ having a bandwidth of $\Delta f_o$. The voltage received in the aerial is represented by Fig. 2*a*. This voltage is applied to the inlet of a radio-frequency reception amplifier having a bandwidth of $k_1F$ (with $k_1$ considerably greater than 1) which is sufficient to amplify, without deformation, a pulsatory wave having a carrier frequency of $f_o$ and a frequency of recurrence of F for reasons which will be hereinafter explained. The amplifier 1 is unblocked periodically, at a frequency of F, by application, to one of its stages, of rectangular pulses supplied by the keying oscillator 2. The signal leaving the amplifier 1 is represented by Fig. 2*b*. It is composed of a voltage of frequency $f_o$ quenched into rectangular pulses having a repetition frequency of F. The spectrum of such a signal is of the form:

$$f_o \pm mF \qquad (1)$$

where $m$ is an integer.

The voltage leaving 1 is applied to the frequency-converter stage 3 which receives, from the local oscillator 4, a voltage of frequency $f$. The output signal of 3 is a pulsatory voltage represented in Fig. 2*c* and having the same shape as that of Fig. 2*b*, but the carrier frequency of the signal being, in this case, $f-f_o$.

The voltage leaving 3 is applied to the inlet of a pass-band amplifier filter 5 having a mean frequency of $f-f_o$ and a pass band $k_3F$ which is lower than F ($k_3$ is lower than 1) so as to allow to pass and to be amplified only the fundamental component of frequency $f-f_o$ of the signal of Fig. 2*c*. In addition, this pass band should be greater than or equal to $\Delta f_o$. The signal leaving 5 is represented in Fig. 2*d*; this is a non-pulsatory voltage of frequency $f-f_o$. This signal is brought back to the frequency $f_o$ in the frequency-converter stage 6 which receives a signal of frequency $f$ from the local oscillator 4. There is obtained, at the outlet of 6, the signal represented in Fig. 2*e*.

The latter signal is applied to a radio-frequency transmitting amplifier 7 (for example the power amplifier of the retransmitter). This amplifier has a bandwidth of $k_2F$ (with $k_2$ considerably greater than 1) which is sufficient for amplifying, without deformation, a pulsatory wave of a carrier frequency of $f_o$, and of a repetition frequency of F. It is unblocked periodically, at the same frequency F, by application, to one of its stages, of rectangular-pulses also supplied by the keying oscillator 2.

The amplifier 7 is unblocked when the amplifier 1 is blocked and vice versa. For this purpose, the unblocking pulses 11 of 7 take place during the intervals between the unblocking pulses 10 of 1. However, the pulses 10 and 11 are not exactly opposite in phase and there is left, between the end of a pulse 10 and the commencement of a pulse 11 a dead period $\tau_1$, and between the end of a pulse 11 and the commencement of a pulse 10 a dead period $\tau_2$. If $\theta_1$ and $\theta_2$ are respectively the duration of a pulse 10 and the duration of a pulse 11, then $$\theta_1+\theta_2+\tau_1+\tau_2=\frac{1}{F}$$

The utility of the dead periods $\tau_1$ and $\tau_2$ will be explained hereinafter.

The outlet of the amplifier 7 is connected to the transmitting aerial 9 and the signal transmitted by this aerial is represented by Fig. 2*f*. It is the same signal as that of Fig. 2*b*, but the pulses 10 and the pulses 11 are interlaced. The result of this is that any reaction between the retransmitted wave and the incident wave is eliminated. In fact, the retransmitted wave (Fig. 2*f*) is present to the inlet of the amplifier 1 during the periods in which the latter is blocked and, as this amplifier has a bandwidth of $k_1F$ which is considerably greater than F, it does not deform the received signal. If, in fact, there had been a deformation, a component of the signal of Fig. 2*f*, either the fundamental component of frequency $f_o$ alone or this fundamental component accompanied by the first harmonics of the spectrum (1), would be present at the output of the stage of amplifier 1 preceding that to which are applied the blocking pulses, together during the blocking periods and the unblocking periods of the latter and would be retransmitted during the latter periods; there would therefore be, in this case, coupling between the transmission and the reception.

The wave transmitted by the transmitting aerial 9 is received by the final recipient either in the form of pulses of carrier frequency $f_o$ or, in a selective receiver, on the fundamental component $f_o$ or on one of the lines of the spectrum $f_o \pm mF$.

In order to fix one's ideas and by way of non-limitative example, let us assume that the radio communication to be received and to be retransmitted has a carrier frequency $$f_o=120 \text{ mc./s.}$$

and a bandwidth $$\Delta f_o \leqslant 2\times 0.25 \text{ mc./s.}$$

that is to say, it has a spectrum comprised between 119.75 and 120.25 mc./s. Let the keying frequency be $F=830$ kc./s. The spectrum of the wave transmitted by the aerial 9 as well as that of the output signal of the amplifier 1 are represented by Fig. 3 in which the line 12 of frequency 120 mc./s. represents the carrier frequency, the lines 13 and 14 of frequency 119.75 and 120.25 mc./s. represent the lateral bands due to the modulation of the carrier frequency, the lines 15, 16, 17, 18, 19 and 38 of frequencies 120.83, 121.66, 122.49, 123.32, 124.15 and 124.98 mc./s. represent the upper lateral bands due to the quenching of the carrier frequency and the lines 20, 21, 22, 23, 24 and 39 of frequencies 119.17, 118.34, 117.51, 116.68, 115.85 and 115.02 mc./s. represent the lower lateral bands due to the quenching.

Let us assume, as the bandwidth of the amplifiers 1 and 7, $$k_1F = k_2F = 10 \text{ mc./s.}$$

that is to say that their pass band will extend from the line 25 of frequency 115 mc./s. to the line 26 of frequency 125 mc./s. Finally let us assume for the pass band of the amplifier filter 5:

$$k_3F = \Delta f_o = 0.50 \text{ mc./s.}$$

so that the limits of this pass band will be exactly the lines 13 and 14. As it is difficult to filter directly a signal of 120 mc./s. over a bandwidth of 0.5 mc./s., its frequency will be reduced to 10 mc./s. by mixing it in the frequency-converter 3 with a signal of 110 mc./s., then it will be filtered in the amplifier filter 5 and its original frequency will be restored by mixing it in the frequency 6 with the same signal of 110 mc./s.

It has been assumed, in Fig. 3, that the interval between the lateral lines 13 and 14 was equal to the bandwith of the filter. In the general case, the bandwith of the communication is very much less than the bandwidth of the filter, e. g., 6 kc./s. in relation to 500 kc./s. Consequently, the responder can retransmit simultaneously a plurality of radio communications, the carrier frequencies $f_o$, $f'_o$ . . . and the lateral bands of which are represented respectively at 12, 69 and 70 for a first communication and at 12', 69' and 70' for a second communication in Fig. 3a on the condition that the carrier frequencies such as $f_o$ and $f'_o$ are inside the pass band of the filter. The possible number of communications retransmitted simultaneously is equal to the ratio of the bandwidth of the filter to the bandwidth of the communication. However, it is not necessary that it should be precisely the lines 12 and 12' which are inside the pass band of the filter. It is sufficient that one of the lines 15 to 24 and 38 and 39 associated with the line 12 and one of the corresponding lines associated with the line 12' should be inside the pass band of the filter and that these two lines should be at more than 6 kc./s. from each other.

Referring to Fig. 4, which represents the keying oscillator, this oscillator comprises a first oscillating tube 41, the oscillating circuit of which is composed of the inductance 42, the fixed condenser 43 and the variable condenser 44. The sine oscillations of frequency F, which are produced in the first stage and are represented in Fig. 5a, are received at the terminals of the choke coil 45 and applied to the grid 47 of the amplifying tube 46 and to the grid of the phase inverting tube 51. On the other band, the output of the phase inverting tube 51 is connected to the grid 53 of the amplifying tube 52.

Amplifying tubes 46 and 52 operate in class C and sine pulses, which are represented in Figs. 5b and 5c, are produced in their anode circuits. The width 27 of the base of each sine pulse obtained is less than the half-period $$\frac{1}{2F}$$

of the base of a complete sinusoid arch. The width 27 of the base of each pulse is determined by regulating, on the one hand, the potential of the cathode 48 of the tube 46 by means of the variable resistor 49 and of the sliding contact 50 connected to the said cathode and, on the other, the potential of the cathode 54 of the tube 52 by means of the variable resistor 55 and of the sliding contact 56 connected to the latter cathode. Each of the variable resistors 49 and 55 is connected between earth and the high voltage and, on displacing the sliding contacts 50 and 56 to the side of increasing potentials, the polarisation potentials of the grids 47 and 53 represented by the lines 28 and 29 of Figs. 5b and 5c respectively are separated from the cut-off voltages of the tubes 46 and 52 represented by the lines 30 and 31 of these figures; the result of this is to diminish the width 27 of the sine pulses.

These sine pulses of Figs. 5b and 5c are applied respectively to the grids 58 and 64 of the class-C amplifying tubes 57 and 63. The potential of the cathode 59 of the tube 57 is regulatable by displacing the sliding contact 60 on the variable resistor 61. On displacing the sliding contact 60 towards the increasing potentials, the line 32 which clips the pulses of Fig. 5b is approached of the line 30 representing their base. Finally, there are obtained, at the terminals of the anode resistance 62 of the tube 67, the pulses 10 of Fig. 5d which are applied as unblocking pulses to the amplifier 1.

The potential of the cathode 65 of the tube 63 is regulatable by displacing the sliding contact 66 on the variable resistor 67. On displacing the sliding contact 66 towards the increasing potentials, the line 33 which clips the pulses of Fig. 5c is approached of the line 31 representing their base. Finally, there are obtained, at the terminals of the anode resistance 68 of the tube 63, the pulses 11 of Fig. 5e which are applied as unblocking pulses to the amplifier 7.

The end 34 of a pulse 10 and the commencement 35 of a pulse 11 are separated by an interval of time of $\tau_1$, and the end 36 of a pulse 11 and the commencement 37 of a pulse 10 are separated by an interval of time of $\tau_2$. The receiving amplifier 1 is unblocked between 37 and 34; during the interval $\tau_1$, comprised between 34 and 35, the receiving and transmitting amplifiers are both blocked; the transmitting amplifier 7 is unblocked between 35 and 36'; during the interval $\tau_2$ comprised between 36 and 37, the two amplifiers are both blocked.

The dead period $\tau_1$ between the end of the unblocking of the reception and the commencement of the unblocking of the retransmission enables the circuits of the amplifier 1 to return to the condition of rest, that is to say to the blocked condition. The dead period $\tau_2$ between the end of the unblocking of the retransmission and the commencement of the unblocking of the reception enables the circuits of the amplifier 7 to return to the condition of rest, that is to say to the blocked condition. The latter dead period, in addition, enables the energy which is retransmitted by the aerial 9 and which is reflected by near obstacles to be present to the input of the amplifier 1 when the latter is still blocked. If it is assumed, for example, that the nearest obstacle that gives harmful reflections is at 50 metres from the aerial 9, the reflected wave requires $$\frac{1}{3}10^{-6}$$

second to return to the aerial 8 which is supposed to be in the immediate vicinity of the aerial 9. It will therefore be necessary to have $\tau_2$ greater than or equal to one-third of a microsecond.

Although certain parts of the invention have been described by way of example, the general idea of the invention can be gathered sufficiently from the foregoing for the person skilled in the art to be able to make numerous modifications without departing from its scope.

What I claim is:

1. A responder for retransmitting a plurality of incoming continuous modulated carrier waves of given frequencies applied thereto comprising input means for receiving said incoming continuous modulated waves, output retransmitting means driven by said waves, a free running keying oscillator having two outputs in push-pull relationship respectively connected to the input receiving means and to the output retransmitting means and producing on said outputs two blocking signals substantially in phase opposition for alternately blocking said input and output means, whereby the output waves of the receiving and retransmitting means are pulsed at the blocking signal frequency, a pass band filter coupling the input receiving means to the output retransmitting means, having a narrow bandwidth with respect to the blocking signal frequency and allowing to pass therethrough the waves driving the retransmitting means, the receiving and retransmitting means having a large bandwidth with respect to the blocking signal frequency, whereby the fundamental components of the output waves of the receiving means which are derived from the incoming waves continuously present at said receiving means input are passed through the filter to drive the output means while the fundamental components of the output waves of the receiving means which are derived from the retransmitted waves occurring at said receiving means input when the same are blocked and are not passed through the filter.

2. A responder for retransmitting a plurality of incoming continuous modulated carrier waves of given frequencies applied thereto comprising a radio-frequency receiving amplifier, a first frequency converter connected to said amplifier, a radio-frequency transmitting amplifier driven by the incoming waves, a second frequency converter connected to said latter amplifier, a local oscillator connected to the first and second frequency converters, a free running keying oscillator having two outputs in push-pull relationship respectively connected to the radio-frequency receiving and transmitting amplifiers and producing on said outputs two blocking signals substantially in phase opposition for alternately blocking said radio-frequency receiving and transmitting amplifiers whereby the output waves of said both amplifiers are pulsed at the blocking signal frequency, a pass band filter coupling the first and second frequency converters, having a narrow bandwidth with respect to the blocking signal frequency and allowing to pass therethrough the incoming waves being changed in frequency by the first frequency converter, the receiving and retransmitting radio-frequency amplifiers having a large bandwidth with respect to the blocking signal frequency, whereby the fundamental components of the output waves of the receiving amplifier, being changed in frequency by the first frequency converter, which are derived from the incoming waves continuously present at said receiving amplifier input are passed through the filter, to be brought back to their original carrier frequency by the second frequency converter and drive the transmitting amplifier while the fundamental components of the output waves of the receiving amplifier, being changed in frequency by the first frequency converter, which are derived from the retransmitted waves occurring at said receiving amplifier input when the same is blocked are not passed through the filter.

3. A responder for retransmitting a plurality of incoming continuous modulated carrier waves of given frequencies applied thereto comprising input means for receiving said incoming continuous modulated waves, output retransmitting means driven by said waves, a free-running keying oscillator having two outputs in push-pull relationship respectively connected to the input receiving means and to the output retransmitting means and producing on said outputs a periodic signal which comprises in each cycle a first period during which the input receiving means are unblocked, a second period during which both the input receiving and output retransmitting means are blocked, a third period during which the output retransmitting means are unblocked and a fourth period during which both the input receiving and the output retransmitting means are blocked, whereby the output waves of said receiving and retransmitting means are pulsed at said signal frequency, a pass band filter coupling the input receiving means to the output retransmitting means, having a narrow bandwidth with respect to the blocking signal frequency and allowing to pass therethrough the waves driving the retransmitting means, the receiving and retransmitting means having a large bandwidth with respect to the blocking signal frequency, whereby the fundamental components of the output waves of the receiving means which are derived from the incoming waves continuously present at said receiving means input are passed through the filter to drive the output means while the fundamental components of the output waves of the receiving means which are derived from the retransmitted waves occurring at said receiving means input when the same are blocked are not passed through the filter.

PIERRE C. MARCOU.

References Cited in the file of this patent

UNITED STATES PATENTS

| Number | Name | Date |
|---|---|---|
| 2,425,315 | Atwood et al. | Aug. 12, 1947 |
| 2,427,191 | Brink | Sept. 9, 1947 |
| 2,477,585 | Dodington | Aug. 2, 1949 |